Feb. 13, 1951 — C. M. RICE — 2,541,288
RESIDENTIAL MOTOR COACH
Filed March 8, 1946 — 3 Sheets-Sheet 1
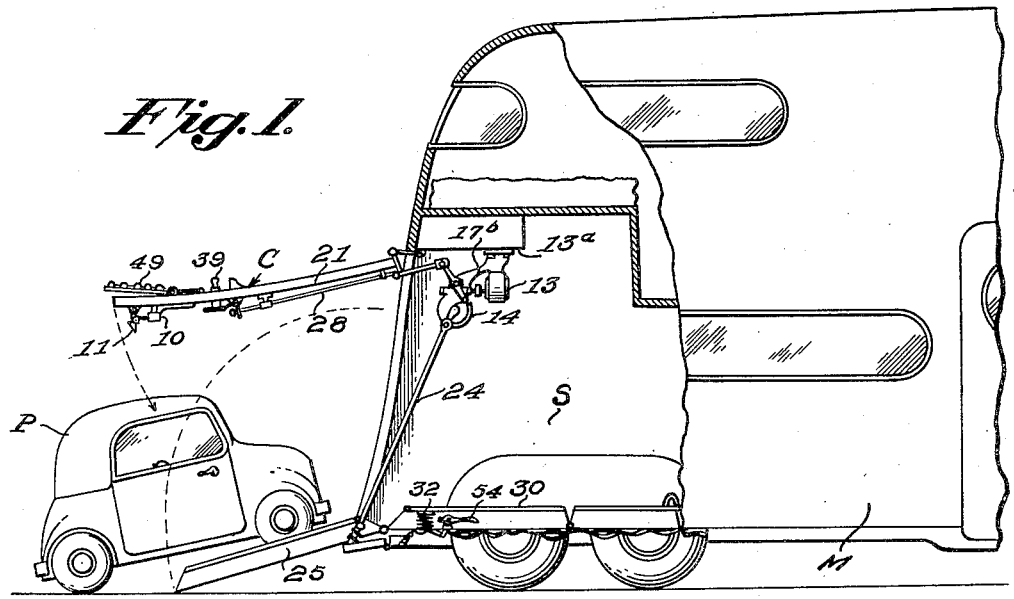
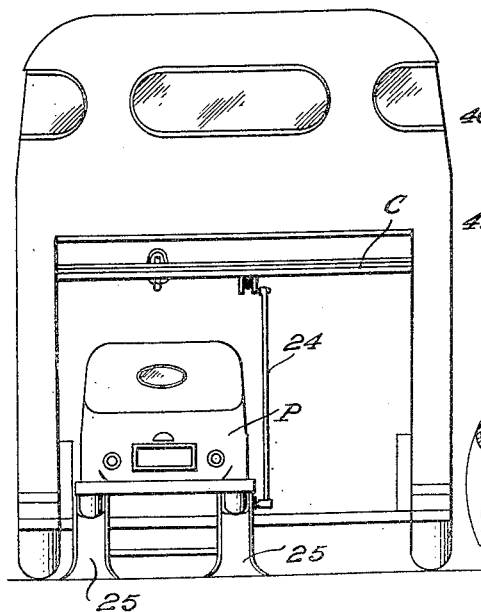
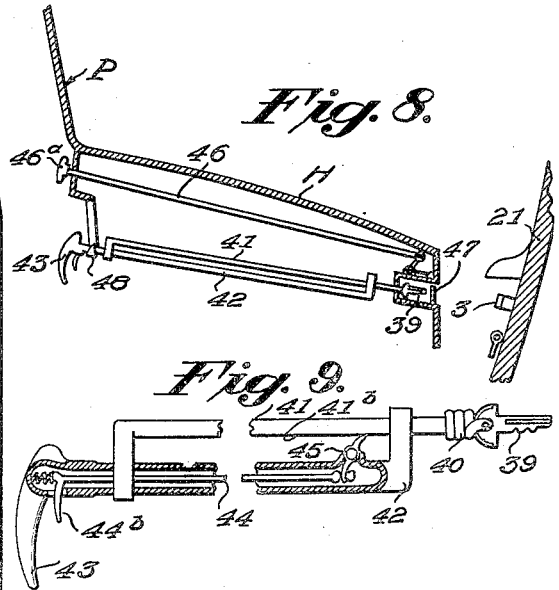
INVENTOR
Clifford M. Rice
By George E. Cook
ATTORNEY

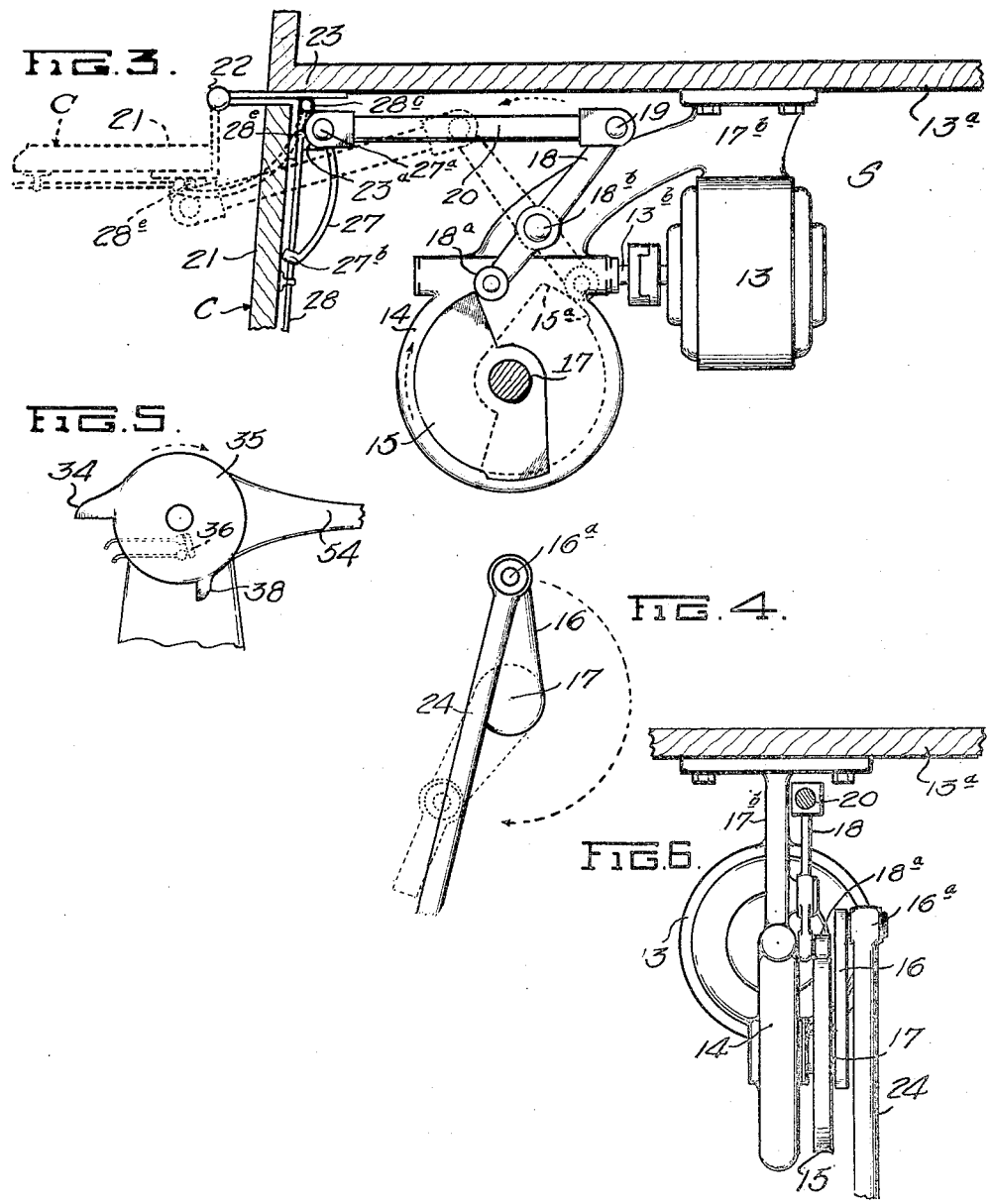

Feb. 13, 1951 C. M. RICE 2,541,288
RESIDENTIAL MOTOR COACH
Filed March 8, 1946 3 Sheets-Sheet 3
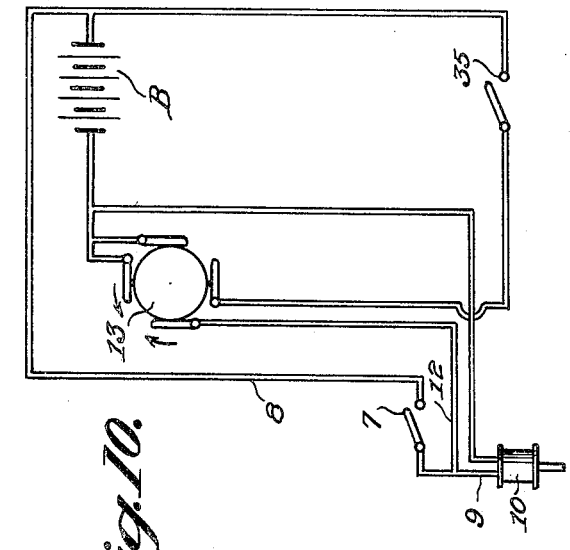
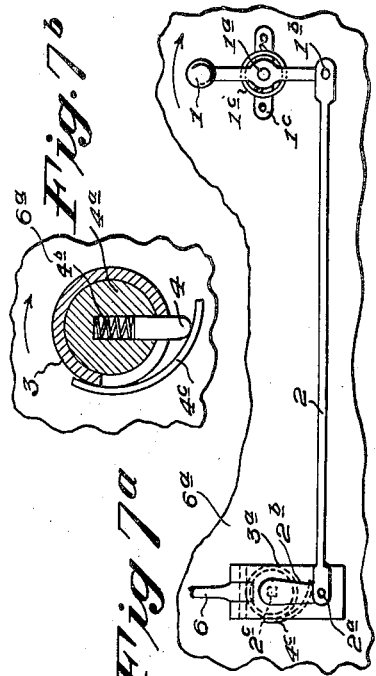
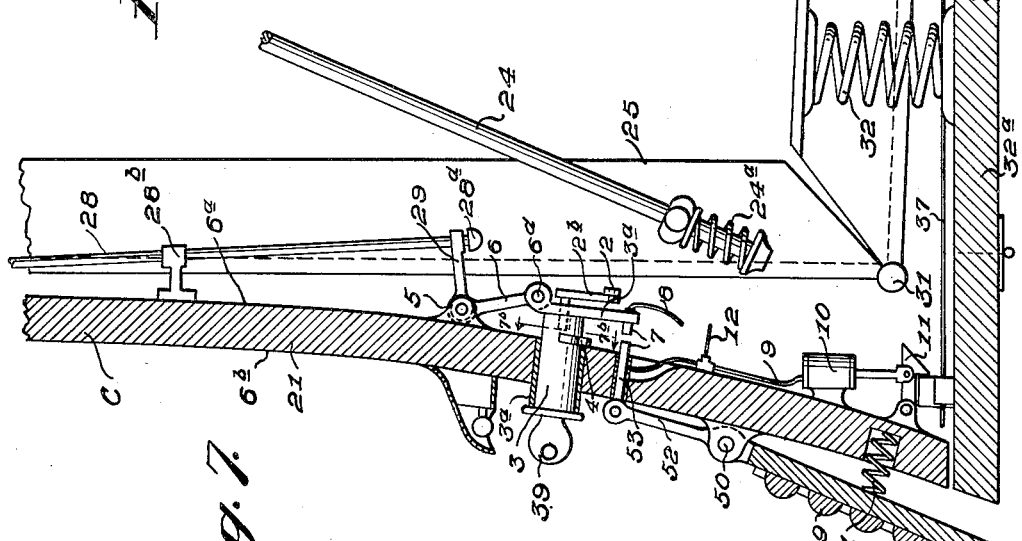
INVENTOR.
Clifford M. Rice
BY George E. Cook
ATTORNEY.

Patented Feb. 13, 1951

2,541,288

UNITED STATES PATENT OFFICE 2,541,288

RESIDENTIAL MOTOR COACH

Clifford M. Rice, Daytona Beach, Fla.

Application March 8, 1946, Serial No. 652,992

9 Claims. (Cl. 214—85)

1

The instant invention relates to motor coaches and more specifically to such a coach having means for transporting, loading and unloading a smaller vehicle hereinafter designated as a personal car.

By a motor coach is meant a large self-propelled vehicle the interior of which may be used for living quarters, office or display space and for similar purposes, while by a personal car is meant a small self-propelled vehicle for the transportation of individuals. The parking of a large vehicle such as the motor coach in question in congested areas is often difficult and frequently not possible, so that resort must be had to larger areas on the outskirts of a city or town and thus remote from the business center thereof. According to the present invention the user of the motor coach is supplied with a small personal car which can be conveniently used in congested traffic and easily parked in a small space, means being present whereby the two separate units of transportation may be combined or used separately, as desired.

Consequently, one of the primary objects of the invention is to provide means for housing the personal car within the motor coach and to facilitate quick and easy removal from and entrance of the car into the coach; to provide means of exit of the car from the coach which will automatically close and lock thus materially adding to the comfort and convenience of the passengers, particularly in inclement weather.

Yet another aim is the provision of means for unlocking and automatically opening the coach closure barring the entrance of the personal car into the coach from within the latter; also the provision of means for unlocking and automatically opening the coach closure from within the personal car to permit entrance into the coach and finally the provision of means to accurately guide the personal car so that it may be driven into the interior of the coach.

The above and other aims and objects will be apparent from the detailed description hereinafter appearing when taken in conjunction with the appended drawings forming a part hereof to which attention is now directed and in which Figure 1 is a fragmental side elevational view of a residential motor coach, partly broken away, showing a rear closure means thereof in position to load the small personal car into the rear thereof;

Figure 2 is a rear elevational view of the structure of Figure 1 showing the personal car within the residential coach and illustrating the wheel

2 ramps and wheel ramp raising and lowering rod;

Figure 3 is a side elevational view of the door and ramp raising and lowering motor assembly housed within the rear of the coach;

Figure 4 is a side elevational view of a crank arm integral with the shaft of the wheel ramp raising and lowering means;

Figure 5 is a detailed view of a door-closing switch;

Figure 6 is a rear elevational view of the raising and lowering means shown in Figure 3;

Figure 7 is a side elevational view, partly in section, showing portions of the motor coach floor, rear door, wheel ramps, door opening and closing switches, and associated mechanism;

Figure 7a is an elevational view partly broken away, of a lock actuating lever on the inner surface of the hinged door or closure;

Figure 7b is an enlarged sectional view in the plane of line 7b—7b on Fig. 7;

Figure 8 is a side elevational view of an extension key installed in the hood of the personal car preparatory to insertion into the rear closure of the coach;

Figure 9 is a detail of the extension key of Figure 8; and

Figure 10 is a wiring diagram of the electrical means for the structural features shown in Figures 1 to 7 inclusive.

Referring first to Figures 1 and 2 of the drawing, the reference character M designates a residential motor vehicle or coach having a hinged closure C leading to a rear space S within the coach M for housing a personal motor vehicle P.

Positioned within the space S in the rear of the motor coach M as on the inner surface of the hinged closure C, Figures 7 and 7a, is a hand lever 1 pivoted at 1a on a bracket 1c which is secured to the inner surface 6a of the hinged closure C. One end of lever 1 is pivoted at 1b to one end of a rod 2, said rod 2 extending transversely of coach M and paralleling the inner surfaces 6a of hinged closure C, the other end of rod 2 being pivoted at 2a to a lever 2b, said lever 2b being operatively connected to the central actuating tumbler mechanism 4a of a lock 3 extending through closure C, said lock having a retractible latch 4. The operative connection between lever 2b and the tumbler 4a may be in the form of a squared shaft 2c having a lengthwise slidable fit in a correspondingly shaped aperture in the tumbler. The lock 3 may comprise a cylindrical shell having a plate 3a rigid with its inner end and through which the shaft 2c extends. Movement of the hand lever 1 in the direction of the arrow serves to retract latch 4 by the rotary movement of the tumbler mechanism of lock 3. The latch 4 may comprise an elongated member slidably disposed in a radial recess in the tumbler 4a and backed by a relatively light coil spring 4b and a cam track 4c may be provided on the inner surface 6a of closure C on which the free end of latch 4 rides whereby upon rotation of the tumbler the latch will be forced inwardly to within the outer cylindrical surface of the lock 3.

A coil spring 1d may have its opposite ends secured to lever 1 and bracket 1c whereby the tumbler 4a will return to normal angular position about its axis upon release of lever 1 so that the latch 4 will engage the inner surface 6a of closure C upon closing movement thereof. Retraction of latch 4 permits lock 3 to slide rearwardly in its casing 3a which is fastened within hinged closure C. This rearward sliding action is caused by a coil spring 5 pressing on its arm 6, the lower end of said arm 6 being pivotally secured at 6d to the main body or plate 3a of lock 3. Arm 6 is integral with a toggle arm 29 hereinafter described, said arms being pivotally mounted on the inner surface 6a of closure C. Retraction of latch 4 permits main body of lock 3 to slide rearwardly and close spaced electrical contacts 7 (one of which is carried by plate 3a) connected to a suitable source of electrical energy such as a battery B by wires 8 and 9, thus energizing a solenoid 10 connected to a latch member 11 resulting in raising of the latter. Simultaneously the circuit is closed (see Figure 10) through current-carrying wire 12 to actuate a reversible motor 13 supported on and downwardly depending from the ceiling 13a defining a portion of the space S within the motor coach M. Motor 13 has a motor shaft 13b connected to a conventional worm reducing gear 14 for rotating a cam 15 and a crank arm 16 fixed to worm gear actuated shaft 17—see Figures 3 and 6. An arm 18 is pivoted intermediate its ends as at 18b to a ceiling bracket 17b, the upper end 19 of the arm 18 being pivotally connected to a closure-operating arm 20. Closure C embodies a door 21 movably connected to a hinge 22 fastened at 23 to the motor coach M and closure-operating arm 20 is pivotally fastened to the door 21 as at 27a.

Arm 18 includes a roller 18a at its other end for actuation by the cam 15 which is provided with a raised portion 15a. Starting the motor 13 causes rotation of cam 15 in a clock-wise direction, said cam contacting roller 18a of the arm 18 to move the latter from the solid to the dotted line position in Figure 3, movement of arm 18 resulting in actuation of arm 20 and raising of door 21. A curved rod 27 is pivotally secured to the stationary portion of hinge 22 as at 28c, the lower end of rod 27 having an eye 27b through which passes an elongated rod 28 movably secured to the inner surface 6a of door 21 as by spaced bracket 28b. Rod 28 has terminal knobs 28e and 28d, the latter cooperating with a toggle arm 29 secured to pivot arm 6. Continued rotation of cam 15 causes raised portion 15a to elevate curved arm 27 sufficiently to bring eye 27b thereof into engagement with the knob 28e of elongated rod 28 to move the latter upwardly.

This upward movement causes knob 28d to raise toggle rod 29 to remove pressure of spring-actuated rod 6 against spring-lock tumbler 3 resulting in movement of the latter to the right in Figure 7 and the consequent breaking of contacts 7 and the stopping of motor 13. Before this occurs crank arm 16 has been actuated by shaft 17, the crank arm being pivotally secured as at 16a to a ramp-actuating rod 24 secured as at 24a to wheel troughs or ramps 25. Movement of the rod 24 to the dotted line position of Figure 4 results in lowering of ramps 25 and the personal vehicle or car P may now be backed from the coach M down the ramps.

A central section 30 of a trough or ramp 25 is hinged at opposed ends as at 31, 31b. The lower surface of central section 30 is supported on coil spring 32 resting on floor 32a of the coach M, and the right hand central section 30 carries a trip arm 33 for cooperation with the ear 34 of a door-closing switch 35 having a current-closing contact 36. In the normal position of the parts with the wheels of the personal car P resting on the troughs 25, the weight of the car keeps trip arm 33 out of contact with ear 34 of the rockable switch 35. However, when the car P is backed out of the coach M, the weight is removed and the spring 32 raises the central section 30 slightly causing trip 33 to contact ear 34 to rock same clockwise to close switch 35 through contact 36 to start motor 13 in a reverse direction resulting in lowering of door 21. As the latter reaches its lowermost position it contacts a rod 37 slidably supported on floor 32a forcing the rod forwardly to strike an ear 38 of the switch 35 to rock same counterclockwise into contact-breaking positions and stop motor 13, while the door 21 is now held closed by latch 11.

Referring now to Figures 8 and 9 it will be seen that hood H of the personal car P is provided with a rod 46 operable from the driver's seat, said rod having a knob 46a for actuating a small door 47. Inward pull on rod 46 opens door 47. Positioned beneath rod 46 are telescopic rods 41 and 42, the former terminating in a coil spring 40 to which a key 39 is secured. Rod 42 terminates in a handle 43 having a ratchet 45 for cooperation with a rack 41b on rod 41. Ratchet 45 is actuatable by ratchet rod 44 equipped with a spring-pressed trigger 44b. When handle 43 is lifted by the driver of the car from support 48 secured beneath the hood H and rod 42 pulled rearwardly, ratchet 45 will slide along rack 41b of rod 41 to materially extend combined length of rods 41 and 42. Key 39 may now be projected forwardly through opening formed by small door 47 into lock 3 after the personal car P is brought into an aligned position as illustrated in Figure 8. Rotation of key 39 will result in release of the spring-pressed tumbler of the lock and closing of contacts 7 to operate motor 13 to open door 21 and lower ramps 25 in a manner previously described. In lieu of the car-carried key 39 a conventional key may be employed and inserted into the lock, the driver stepping out of the car for this purpose.

A safety arrangement is provided whereby the motor 13 is stopped in the door raising operation should the door 21 contact any object. By reference to Figure 7 it will be seen that the outer surface 6b of door 21 carries a bumper 49 adjacent the lower edge thereof, said bumper being pivoted at 50 and normally pushed outwardly by a coil spring 51. An arm 52 is integral with bumper 49, said arm being connected to a pin 53 forming part of one of the contacts 7. It will now be seen that if during the door-raising operation bumper 49 contacts an object such as the personal car P, the pin 53 will be moved to the left to break contacts 7 thus stopping the motor 13 until pressure on bumper 49 is removed.

After the personal car has entered the space S within the motor coach M, the closure C may be lowered by means of pedal 54 forming part of switch 35. The driver leaves the car P, steps on pedal 54 thus closing switch 35 and lowering closure C and raising troughs 25 until the switch 35 is tripped by rod 37, as previously described.

From the above it will be apparent that the various objects of the invention have been attained. It will be understood that various changes may be made in the specific details disclosed and it is contemplated to cover all such and to be limited in this respect only as may be necessary by the scope of the claims hereto appended.

What I claim and desire to secure by Letters Patent is:

1. In a motor coach having a swingable closure pivotally connected at its upper end to the coach and a ramp pivotally connected at its lower end to the couch, a key-operated latch carried by the closure and engageable with a keeper on the coach for normally maintaining the closure in closed position, a motor disposed within the coach, operative connections between the motor and closure and additonal independent connections between the motor and the ramp for raising the former and lowering the latter about their respective pivotal connections with the coach upon operation of the motor, a solenoid operatively connected with the latch for disengaging same from the keeper upon energization of the solenoid, a pair of normally spaced engageable contacts in circuit connection with said motor and said solenoid, and a battery and manually actuatable means for effecting engagement of the contacts whereby the latch is released by the solenoid and the closure raised by the motor.

2. The structure according to claim 1, wherein one of said contacts is carried by the closure, the other contact being carried by a member slidably disposed in the closure at right angles thereto, yieldable means urging the member in a direction to effect engagement of the contacts, a latch carried by the member normally engaging the closure for restraining sliding movement of the member by the yieldable means, said manually actuatable means including mechanism for disengaging the latch from the closure for engagement of the contacts by the action of said yieldable means.

3. The structure according to claim 1 together with a bumper pivotally supported on the closure and connected with one of said contacts for separation of the contacts upon engagement of the bumper with an object during the raising action of the closure.

4. In a motor coach having a swingable closure pivotally connected at its upper end with the coach and having a key-operated latch at its lower end normally engaged with a keeper on the coach, a solenoid operatively connected with the latch for disengaging same from the keeper upon energization of the solenoid, a motor disposed within the coach, operative connections between the motor and closure for raising the closure upon energization of the motor, a pair of normally spaced contacts in electrical circuit with the solenoid, motor and a battery, one of said contacts being carried by a cylindrical member slidably disposed in the closure for movement of said contact into engagement with the other contact, spring means biasing said member to contact engaging position, a retractible latch carried by the member and normally engaging the closure for retraining movement of the member to contact closing position, and manually operable means within the coach for retracting the latch to permit movement of the member to contact closing position by said spring means.

5. The structure according to claim 4 wherein said last-named latch is carried by a tumbler rotatably supported within said member, said tumbler being rotatable by a key from the exterior of the coach to effect engagement of said contacts.

6. The structure according to claim 4 together with lever and rod means operable through raising movement of the closure for disengaging said contacts.

7. The structure according to claim 4 wherein said operative connections between the motor and closure comprises a motor driven rotatable cam, an arm having one end thereof pivotally connected to the closure, and a second arm pivotally supported intermediate its ends and having one end thereof pivotally connected to the first arm and the other end thereof engageable by said cam.

8. In a motor coach having a swingable closure pivotally connected at its upper end to said coach and having a latch at its lower end normally engaging a keeper on the coach, a ramp including hinged sections with the main body portion thereof normally disposed within the coach adjacent the inner wall of the closure, a reversible motor supported within the coach, a battery for said motor, a solenoid operatively connected with the latch, operative connections between the motor and the closure and ramp, a pair of engageable normally spaced contacts in electrical circuit with said solenoid, motor and battery, and manually operable means for effecting engagement of said contacts whereby the solenoid and motor are energized, the closure latch released, the closure raised and the ramp moved to operative position.

9. The structure according to claim 8 wherein one of the sections of the ramp is supported above the floor of the coach by yieldable means, a switch, electrical connections between the switch and said motor, and means carried by said section operative to close said switch upon upward movement of the section by said yieldable means to effect reverse rotation of the motor for retracting said ramp within the coach and lowering said closure.

CLIFFORD M. RICE.

REFERENCES CITED

The following references are of record in the file of this patent:

UNITED STATES PATENTS

| Number | Name | Date |
|---|---|---|
| 1,367,931 | Varnum | Feb. 8, 1921 |
| 1,578,177 | Schrade | Mar. 23, 1926 |
| 1,736,103 | Vanderzee | Nov. 19, 1929 |
| 2,004,439 | Judd | June 11, 1935 |
| 2,064,814 | Andrews | Dec. 22, 1936 |
| 2,113,291 | Clark et al. | Apr. 5, 1938 |
| 2,138,521 | Ellis | Nov. 29, 1938 |
| 2,323,279 | Van Zelm | June 29, 1943 |
| 2,329,176 | Griffith et al. | Sept. 14, 1943 |
| 2,402,283 | Hewitt | June 18, 1946 |
| 2,405,878 | Elwert | Aug. 13, 1946 |
| 2,424,862 | Stuart | July 29, 1947 |